(12) United States Patent
Buchmann et al.

(10) Patent No.: US 8,397,898 B2
(45) Date of Patent: Mar. 19, 2013

(54) SCALABLE SHIPPING BUFFER HAVING AN INTEGRATED SORTING FUNCTION AND CORRESPONDING METHOD

(76) Inventors: Rainer Buchmann, Graz (AT); Heiko Suess, Graz (AT); Max Winkler, Graz (AT)

( * ) Notice: Subject to any disclaimer, the term of this patent is extended or adjusted under 35 U.S.C. 154(b) by 0 days.

(21) Appl. No.: 13/010,798

(22) Filed: Jan. 21, 2011
(Under 37 CFR 1.47)

(65) Prior Publication Data
US 2012/0118699 A1  May 17, 2012

Related U.S. Application Data

(63) Continuation of application No. PCT/EP2009/004998, filed on Jul. 9, 2009.

(30) Foreign Application Priority Data

Jul. 30, 2008 (DE) .......................... 10 2008 036 564

(51) Int. Cl.
*B65G 1/00* (2006.01)
(52) U.S. Cl. ..................... 198/347.4; 198/435; 198/442; 198/720; 198/737
(58) Field of Classification Search ............... 198/347.4, 198/435, 442, 720, 737
See application file for complete search history.

(56) References Cited

U.S. PATENT DOCUMENTS

| | | | |
|---|---|---|---|
| 3,604,551 A * | 9/1971 | Fink | 198/448 |
| 3,734,264 A * | 5/1973 | Stumpf | 198/347.4 |
| 3,974,888 A | 8/1976 | Murakami et al. | |
| 4,401,207 A * | 8/1983 | Garvey | 198/580 |
| 5,161,678 A * | 11/1992 | Garvey | 198/860.3 |
| 6,039,169 A * | 3/2000 | Zaniboni | 198/347.1 |
| 6,412,621 B1 * | 7/2002 | De Vree et al. | 198/347.4 |
| 6,681,916 B2 * | 1/2004 | Hiroki | 198/347.1 |
| 6,782,990 B2 * | 8/2004 | Joutsjoki et al. | 198/347.4 |
| 6,784,391 B2 * | 8/2004 | Takizawa | 209/583 |
| 6,814,221 B2 * | 11/2004 | Goussev | 198/580 |
| 7,669,706 B2 * | 3/2010 | McLaughlin et al. | 198/349 |
| 7,798,759 B2 * | 9/2010 | Bonora et al. | 414/331.17 |
| 8,037,994 B2 * | 10/2011 | Schaefer | 198/456 |

* cited by examiner

*Primary Examiner* — Joseph A Dillon, Jr.
(74) *Attorney, Agent, or Firm* — Timothy M. Barlow

(57) ABSTRACT

A scalable shipping buffer (22; 50; 88) with an integrated sorting function for preparing a consignment comprising a number of different products (42), wherein the products (42) can be loaded into a transporting vehicle (24) in an ordered sequence and wherein the products (42) are delivered to the shipping buffer (22; 50; 88) in a disordered sequence, comprising: a drawing-off path (30), in particular a central drawing-off path, for conveying the products (42) in a downstream direction to a transfer point (41), at which the products (42) are transferred in the direction of the transporting vehicle (24) according to the ordered sequence, wherein the drawing-off path (30) extends essentially in a longitudinal direction (31); a first buffer path (32; 34), which extends essentially parallel and adjacent to the drawing-off path (30) and has a first number of buffer locations (39); a multiplicity of transfer devices (38), wherein the transfer devices are arranged in such a way that each buffer location (39) of the first buffer path is assigned at least one transfer device (38) for a transfer of one or more products (42) from the first buffer path (32) to the drawing-off path (30); and a feeding-in device (36; 52), which is arranged in such a way that the products (42) which are supplied to the drawing-off path (30) in the unordered sequence can be fed into the first buffer path (32).

16 Claims, 8 Drawing Sheets

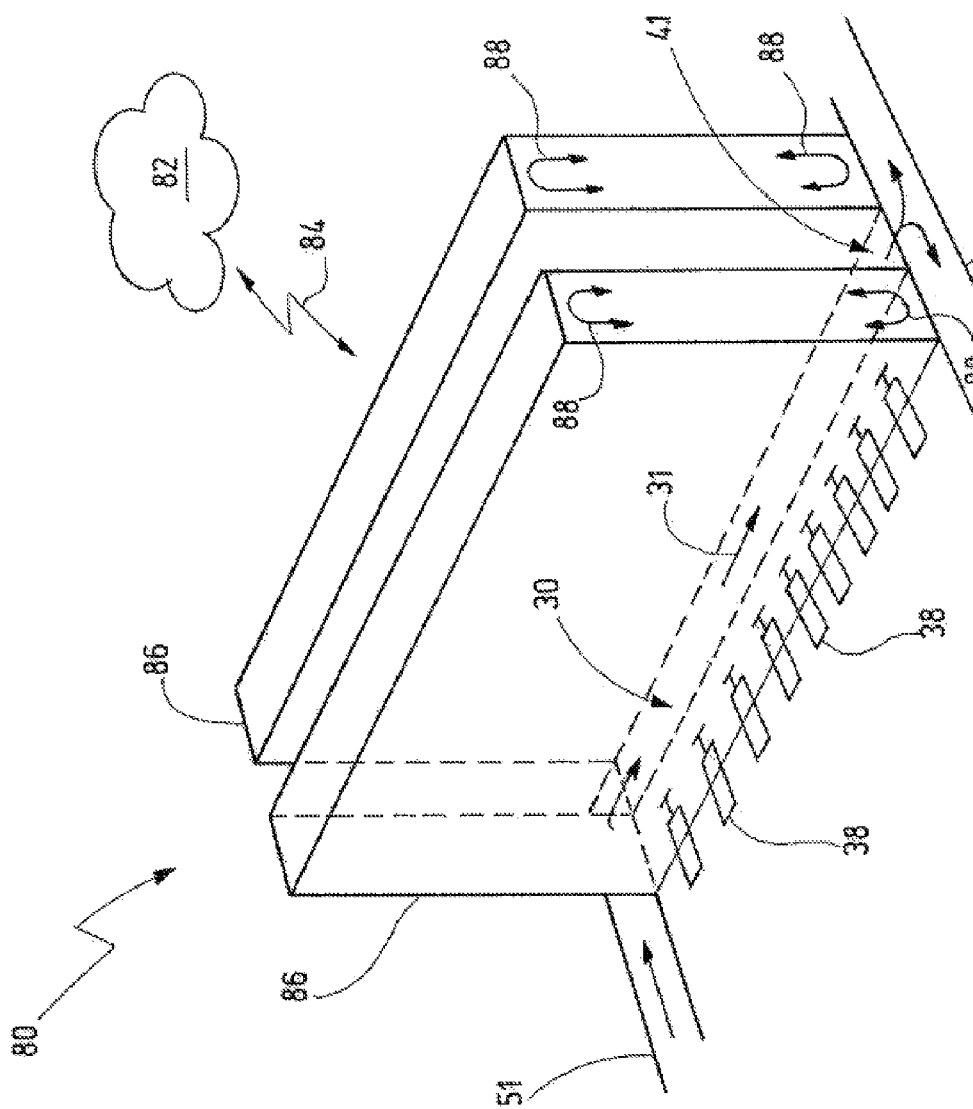

SCALABLE SHIPPING BUFFER HAVING AN INTEGRATED SORTING FUNCTION AND CORRESPONDING METHOD

RELATED APPLICATIONS

This is a continuation application of the co-pending international patent application WO 2010/012364 A1 (PCT/EP2009/004998) filed on Jul. 9, 2009 which claims priority of the German patent application DE 10 2008 036 564 filed on Jul. 30, 2008, which is fully incorporated herewith by reference.

TECHNICAL FIELD

The present invention relates to a scalable shipping buffer having an integrated sorting function as particularly used in a central retail warehouse for preparing truck loads in order to supply retail subsidiaries with goods in accordance with an order. The present invention further relates to a method for preparing a corresponding shipment of goods.

BACKGROUND

In conventional order-picking systems, individual picking orders are frequently received and processed over the day. Some orders can be picked immediately after the receipt. Other orders may not yet have come in, but will be received in the course of the day. In this case, it may also happen that a customer, such as a retail subsidiary, transmits a number of orders on the same day respectively having different content. In this case, the problem is that goods which are to be sent, for example, to the same subsidiary, need to be stored over a certain period of time in order to keep the number of delivery trips as low as possible. It is a problem on principle to accumulate deliveries and prepare the same for a loading process.

In order to solve this problem, so-called "accumulation tracks" have been proposed in the prior art for accumulating goods of one single order, or of one single subsidiary (in some cases a sum of a number of orders). Such accumulation tracks are exemplarily described in the European patent EP 1 542 916 B1. These accumulation tracks typically are very long, allowing accumulating all goods, which are determined for one track, one after the other and side-by-side. The document EP 1 542 916 B1 discloses a method for keeping gaps between individual goods of an order as small as possible, in order to pack the to-be-accumulated goods as dense as possible. Nevertheless, a lot of space is required for allowing building correspondingly long accumulation tracks in a shipping area of the order-picking system. As a rule, a number of orders (track loads) are handled in parallel by arranging a number of accumulation tracks side-by-side (in a horizontal plane).

Additional conveyors and loading devices are described in the documents DE 38 30 692 A1, U.S. Pat. No. 3,974,888 A, DE 10 2004 001 181 A. EP 438 667 A2, EP 447 104 A2 and DE 195 18 298 A1.

Another problem caused by the preparation of different goods is to be seen in the loading or unloading sequence of the goods. In particular, retail subsidiaries typically wish to have an unloading sequence for the ordered goods, since the ordered goods are loaded directly from the truck into the racks of the subsidiary. Thus, a lot of customers pre-determine the unloading sequence, which is expressed in terms of a mirrored loading sequence. However, if different articles of an order are handled at different times within the order-picking system, provision of a so-called "sorter", (i.e. a sorting device) is necessarily required, the sorter being arranged upstream relative to the shipping area including the plurality of accumulation tracks. A conveyor circle is an exemplary sorter, which is arranged between a warehouse and order-picking area and a shipping area including several destinations or shipping locations. Goods can circle within the circle for a longer time until the article, which is required next in the accumulation track (shipping location) in accordance with a predetermined loading or unloading sequence, is introduced into the circle. This is disadvantageous in that a relatively space-consuming unit (conveyor circle in terms of a sorter) is used. On the other hand, a significant computing expenditure at the end of a superordinated controlling device (material flow computer) can be caused, in particular if the orders are processed in parallel, in order to manage the goods of the different orders simultaneously, in particular when mixing and subsequently separating the same.

SUMMARY OF THE INVENTION

Therefore, it is an object of the present invention to provide a system and a method which allows reducing a floor space required in an order-picking system as far as possible without the need to abandon typical characteristics such as storing or resorting.

This object is solved by a scalable shipping buffer having an integrated sorting function for preparing a shipment of a plurality of different goods, wherein the goods are to be loaded into a transport vehicle in a sorted sequence and wherein the goods are delivered to the shipping buffer in an unsorted sequence, wherein the shipping buffer comprises: a, particularly centrally arranged, withdrawal line for conveying the goods in a downstream direction to a handover point at which the goods are handed over, in accordance with the sorted sequence, towards the transport vehicle, wherein the withdrawal line substantially extends in a longitudinal direction; a first buffer line extending substantially parallel and adjacent to the withdrawal line and comprising a first number of buffer locations; a plurality of transfer devices, wherein the transfer devices are arranged such that each buffer location of the first buffer line has assigned at least one transfer device for transferring one or more goods from the first buffer line to the withdrawal line; and a feed device which is arranged such that the goods delivered to the withdrawal line in the unsorted sequence are feedable into the first buffer line.

The shipping buffer in accordance with the present invention is shorter than conventional accumulation lines but meets the functionality thereof completely. Besides the functions of buffering or storing goods, goods can also be arranged in accordance with a predetermined sequence. The goods can be sorted by discharging them on one or more buffer lines, which are arranged laterally to the withdrawal line (which is shorter than a conventional accumulation line).

The shipping buffer can be extended arbitrarily, for example, by providing additional buffer lines which are arranged laterally to the outside relative to the withdrawal line.

In accordance with the invention, the shipping buffer further comprises: a second buffer line, which extends parallel to the withdrawal line and which is adjacent to either the withdrawal line, particularly in the longitudinal direction, or to the first buffer line, preferably in the longitudinal direction, wherein the goods can be moved on the second buffer line in an opposing direction relative to the first buffer line; a second feed device which is arranged such that the goods from the withdrawal line or the first buffer line can be fed into the second buffer line; and a discharge device which is arranged for discharging the goods, which are located on the second buffer line, to the withdrawal line or to the first buffer line.

By providing a second buffer line or additional buffer lines, the storage capacity of the shipping buffer is increased. Also, shipments of goods, which consist of a plurality of different goods, can be sorted more easily, since there are several possibilities to discharge the goods from the withdrawal line, which corresponds to a conventional accumulation line with regard to its functionality, without the need to discharge subsequent goods as well, and then to feed them again into the withdrawal line at an appropriate time.

In accordance with another advantageous embodiment, the second feed device is arranged at a downstream end of the withdrawal line or the first buffer line, and the discharge device is arranged at an upstream end of the second buffer line.

In this manner the entire length of the withdrawal line can be utilized for the buffering of the goods. The unsorted buffer lines can preferably comprise the same length as the withdrawal lines so that the storage capacity is increased additionally. Further, a circle can be generated in this manner in which the goods can circulate as long as desired.

Even further, it is advantageous if a transfer device is provided at each buffer location of the at least first buffer line.

Discharged goods can be fed again into the withdrawal line by means of the transfer devices. The more transfer devices are provided, the greater are the possibilities to affect the sequence in a flexible manner according to which the goods are moved on the withdrawal line. The goods, which are located on this first buffer line, can be provided even in an unsorted sequence since the sequence of the return feeds in the withdrawal line can be influenced by means of the individually controllable transfer devices. In this spirit, the transfer devices represent an independent sequencing stage.

Apart from this, it has turned out advantageous if the second buffer line adjoins with its longitudinal side in parallel to the withdrawal line, and comprises a second number of buffer locations, wherein each buffer location of the second buffer line has assigned a transfer device.

As already explained above, provision of transfer devices increases the sorting capability of the shipping buffer in a significant manner. Goods, which are to be discharged onto the second buffer line, can be discharged onto the second buffer line in any desired sequence. In this case, circulation of the goods between the different lines is not required since then each buffer line can discharge goods to the withdrawal line.

In accordance with another preferred embodiment, additional buffer lines are provided respectively having additional feed devices and additional discharge devices.

In accordance with a further advantageous embodiment adjacent buffer lines comprise at least one line-change device which allows the goods to change spatially between the feed device and the discharge device of one buffer line to the adjacent buffer line.

In particular, all of the lines have almost the same geometrical length.

Further, it is advantageous if the lines comprise driven conveyor devices for transporting the goods in the longitudinal direction.

In accordance with a further embodiment, pushers being arranged laterally to the first buffer line or belt discharges are used as transfer devices, wherein a belt discharger is orientated transversally relative to the longitudinal direction of one of the lines and further is arranged in recesses provided within the line, which is preferably formed as a roller conveyor.

In accordance with another preferred and advantageous embodiment the buffer line is part (i.e. a rack compartment) of a vertical rotary rack, wherein each rack compartment of the rotary rack comprises a driven conveyor device. For allowing the goods, which have been delivered to the rack compartment, to be conveyed upstream and/or downstream within the rack, and wherein each rack compartment can be stopped at a height of the withdrawal line allowing an exchange of the goods between the rack compartment (in terms of a buffer line) and the withdrawal line.

The usage of vertical rotary racks results in a significant increase of the storage capacity while the floor space used remains constant. By the usage of vertical rotary racks it is possible to prepare a number of different shipments of goods over one and the same withdrawal line for the subsequent shipping process. Instead of providing a number of parallel shipping buffers, which are arranged in a horizontal plane in a side-by-side manner, the usage of a vertical rotary rack allows exploiting the height of a space at constant floor space use. Thus it is possible, for example, that all shipping locations (such as truck loading ramps) of a system can be supplied only via one single withdrawal line with shipments of goods in the default sequence. This is particularly advantageous for such systems which have their shipments of goods distributed almost equally over the day. In this manner the relatively high construction costs for huge shipping facilities can be reduced drastically. Also, less floor space is needed for the shipping area.

In particular, a number of withdrawal lines are arranged on top of each other, wherein each withdrawal line can be fed with goods via a separate conveyor line.

The shipping buffer is very space-saving in this embodiment. The base area can be kept very small, if the shipping buffer is constructed with a corresponding height. Such a shipping buffer is particularly advantageous, if several shipping locations are arranged in different (facility) floors on top of each other.

Further, it is advantageous if a vertical lift or elevator is arranged at an upstream end and/or at a downstream end of the withdrawal line, allowing the delivery of goods, which are located on the withdrawal line, to shipping locations with are arranged on top of each other.

This embodiment is particularly advantageous when used with one single withdrawal line and when a number of shipping locations being arranged on top of each other are provided. On the other hand, also a number of withdrawal lines being arranged on top of each other can supply one single shipping location with shipments of goods in this manner. While a first withdrawal line has delivered its shipment of goods and is just collecting or sorting another shipment of goods, for example, another withdrawal line being located above or beneath can convey its shipment of goods towards the shipping location by means of the vertical elevator. In this manner time can be saved considerably, since shipments of goods can be prepared and processed in parallel.

In accordance with a preferred embodiment the handover point couples to a shipping conveyor line which can feed a plurality of shipping locations arranged horizontally and on top of each other with goods in the sorted sequence.

If several shipping locations are present, they, or at least some of them, can be arranged spatially distanced to each other so that usage of a conveyor for supplying these far remotely arranged shipping locations is useful.

The above-mentioned object is further solved by a method for preparing a shipment of goods, the goods being delivered in an unsorted manner to a withdrawal line, in order to ship the goods in a sorted sequence, wherein the method comprises the following steps: determining a batch of goods which all belong to one shipment of goods and which are delivered in an unsorted sequence; dividing the shipment of goods into a number of segments and assigning each good to respectively one of the segments, which in turn have respectively assigned one line which can be the withdrawal line or a buffer line; delivering the goods of the batch in the unsorted sequence; navigating each of the goods to the respective assigned line and storing the goods in the line or lines; and delivering, particularly in a segmentwise manner, the stored goods from the withdrawal line at a handover point towards at least one shipping location. wherein the step of delivering includes transferring stored goods of a first buffer line to the withdrawal line as well as transferring storage contents of additional buffer lines to the first buffer line.

BRIEF DESCRIPTION OF THE DRAWINGS

It is clear that the above-mentioned and hereinafter still to be explained features cannot only be used in the respectively given combination but also in other combinations or alone without departing from the scope of the present invention.

Embodiments of the invention are depicted in the drawings and will be explained in more detail in the following description, wherein:

FIG. 8 shows a perspective view of a strongly facilitated shipping buffer in accordance with the present invention, where vertical rotary racks are used laterally relative to the withdrawal line;

PREFERRED EMBODIMENTS OF THE INVENTION

Figure 1:
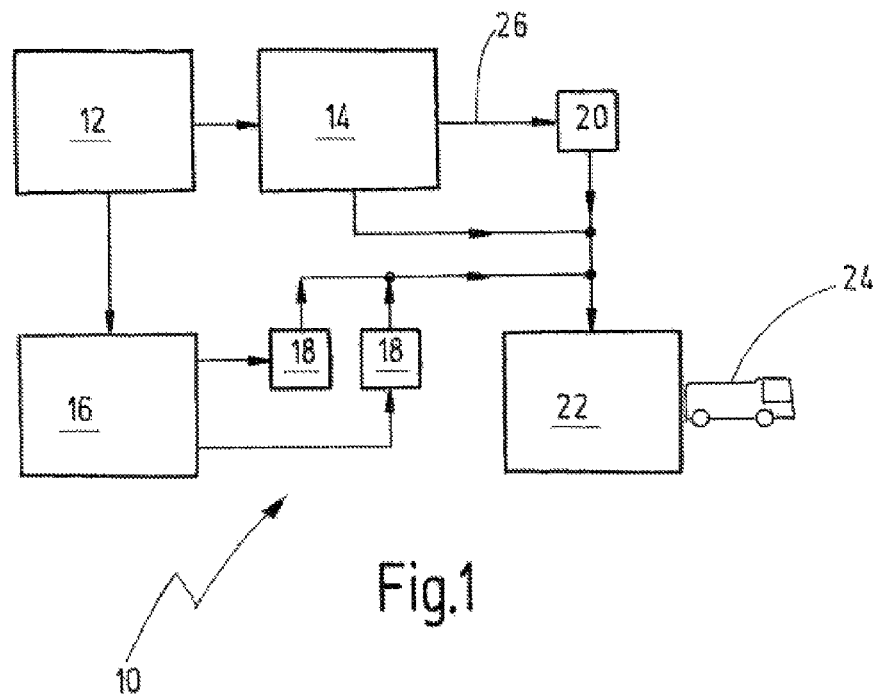
FIG. 1 shows a schematic block diagram of an order-picking system in accordance with the present invention.

In the following description of the figures same features will be designated by the same reference numerals. Similar features will be designated with similar reference numerals.

FIG. 1 shows a block diagram of an order-picking system 10 in accordance with the present invention. The order-picking system 10 of FIG. 1 exemplarily comprises a high bay warehouse 12, a container warehouse 14, a tray warehouse 16, one or more separation stations 18, one or more order-picking stations 20 as well as at least one shipping buffer 22 in accordance with the present invention, which supplies transport vehicles with shipments of goods, wherein trucks 24 are exemplarily shown as the transport vehicles. It is clear that one or more transport vehicles can be supplied with shipments of goods by means of the shipping buffer 22, although FIG. 1 merely shows one single truck 24. The different modules of FIG. 1 are connected to each other via a conveyor being designated with 26. For example, belt conveyors, roller conveyors, chain conveyors etc. can be used for the conveyor.

Further, it is clear that the goods can be delivered with or without load carriers. The goods can be stored in a warehouse region 12-16 of the system 10 in load supports such as containers, bins, pallets, trays, etc. If a shipment of goods is requested without a load carrier, the separation station 18 is used. The separation station 18 separates the goods from their load carrier. If the goods are stored in containers, the goods or the shipment of goods can be picked from the container at an order-picking station and can be conveyed towards the shipping buffer 22.

The system 10 shown in FIG. 1 can be a classical order-picking system such as a central warehouse used by, for example, retailers or pharmacies. A plurality of subsidiaries can be supplied with the goods by means of this central warehouse. The subsidiaries place different orders in the order-picking system 10. Picking orders can comprise a plurality of order lines which in turn comprise different goods at different numbers. Particularly in the retail business, trucks are loaded daily with shipments of goods which are to be loaded into the truck in a default sequence so that the goods can be moved into the subsidiaries in the right sequence, already at the time of unloading same at the subsidiaries. The computing and controlling expenditure in the order-picking system 10 is relatively high for considering in advance the (inverted) sequence of the unloading process at the time of planning the loading of the truck. The plan becomes the more difficult the longer it is not definitely known which goods are to be shipped to a specific destination. The present invention helps to reduce and to solve this difficulty.

With reference to the next following figures, the focus of observation is directed to the shipping buffer 22 or modifications thereof.

Figure 2:
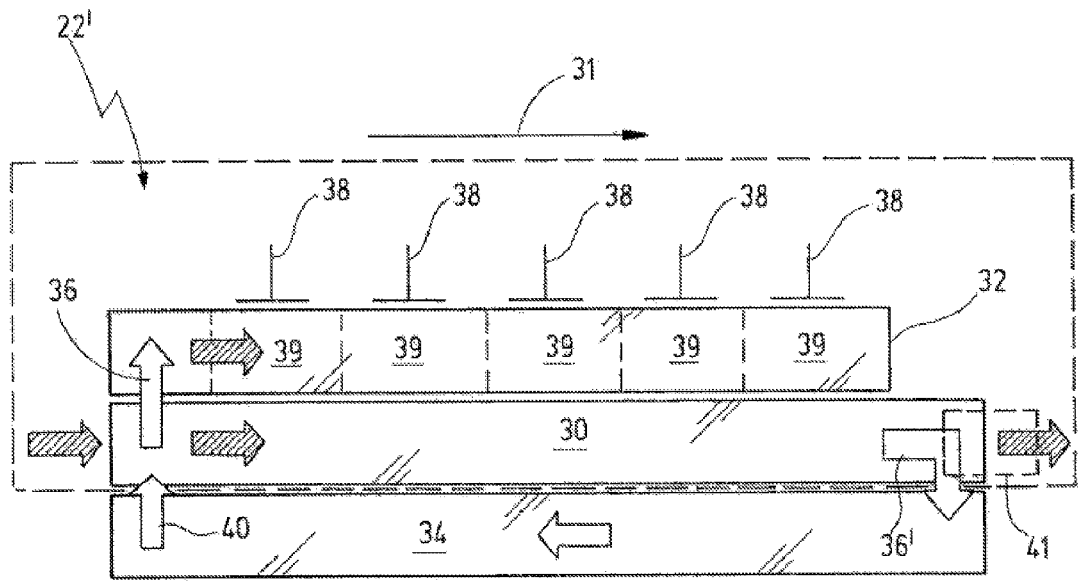
FIG. 2 shows a top view of a first embodiment of a shipping buffer of the present invention.

A first embodiment of a shipping buffer 22' is shown in FIG. 2, where goods, which are not depicted here, are transported on a withdrawal line 30 in a longitudinal direction 31, which is indicated by means of an arrow, from the left to the right in FIG. 1. The shipping buffer 22' further comprises at least a first buffer line 32. The first buffer line 32 is arranged directly adjacent in longitudinal direction to the withdrawal line 30. It is clear that the first buffer line 32 could also be arranged at a greater distance relative to the withdrawal line 30 by providing corresponding conveyor bridges between the lines 30 and 32.

The withdrawal line 30 comprises, for example, at its upstream end a first feed device 36 for feeding goods from the withdrawal line 30 into the first buffer line 32. The feed device 36 is indicated by means of a dark vertical arrow in FIG. 2. It is clear that the feed device 36 could also be arranged at an outside location, e.g. in front of the lines.

Another feed device is located at a downstream end of the withdrawal line 30 and is also indicated by means of a dark vertical arrow. The feed device 36' serves for feeding goods from the withdrawal line 30 in the second buffer line 34. Pushers, vertical belt dischargers which can be lifted and lowered (cf. FIG. 7), roller arrays, etc. can be used as the feed device 36, 36'. The lines 30, 32, 34 comprise conveying means, such as belts, motor rollers, chains, or similar, allowing transporting the goods in a default direction. The lines can be formed by one or more parts. In the following description endlessly rotating belts are used for the conveying means of the lines. Shaded arrows indicate material-flow directions or flow-of-goods directions. The withdrawal line 30 conveys goods in a down-stream direction. The same applies to the belt of the first buffer line 32. The second buffer line 34 conveys the goods in an opposite direction, i.e. in an upstream direction. The upstream conveyance direction is caused by the arrangement of the second feed device 36' and the discharge device 40. The feed device 36' and the discharge device 40 could exchange their locations without any problem so that the second buffer line 34 would then be operated in a downstream-directed direction.

Further, the first buffer line 32 has assigned a plurality of transfer devices 38, here five transfer devices. The transfer devices 38 can be realized, for example, by pneumatically actuated pushers, which are arranged relative to the first buffer line 32 such that the goods located on buffer locations 39 can be pushed from the first buffer line 32 onto the withdrawal line 30. The buffer locations 39 are indicated in FIG. 2 by means of broken lines, and are assigned to the stationary transfer devices 38. The transfer devices 38 of FIG. 2 serve for transferring individual goods from the first buffer line 32 to the withdrawal line 30. It is clear that the geometrical size of the buffer locations can be selected freely. The buffer location 39 can be selected, for example, such that two goods can be pushed onto the withdrawal line 30 by one and the same pusher 38. However, this requires that these two goods are already present in the right sequence on the corresponding buffer location 39. More detailed explanation with regard to the "right" (sorted) and wrong (unsorted) sequences will be given subsequently, particularly with reference to the FIGS. 4 and 5.

Also the transfer devices 38 can be sized differently. Two neighboring pushers 38 could be replaced, for example, by a double-sized individual pusher, wherein the capability would be lost to push individual goods onto the withdrawal line 30. Thus, it would be required in turn that the two goods, which are to be pushed, are present in the right sequence.

The smallest unit of the present invention is shown in FIG. 2 by a rectangle surrounded by a broken line. A shipping buffer in accordance with the present invention comprises at least one buffer line. However, additional buffer lines can be provided as desired. The second buffer line 34 shown in FIG. 2 adjoins in longitudinal direction to the withdrawal line 30.

Alternatively, the second buffer line 34 could also adjoin in the longitudinal direction to the free longitudinal side of the first buffer line 32. In this case, for example, height-adjustable second pushers could be used for transferring the goods from the first buffer line 32 to the withdrawal line 30.

Figure 3:
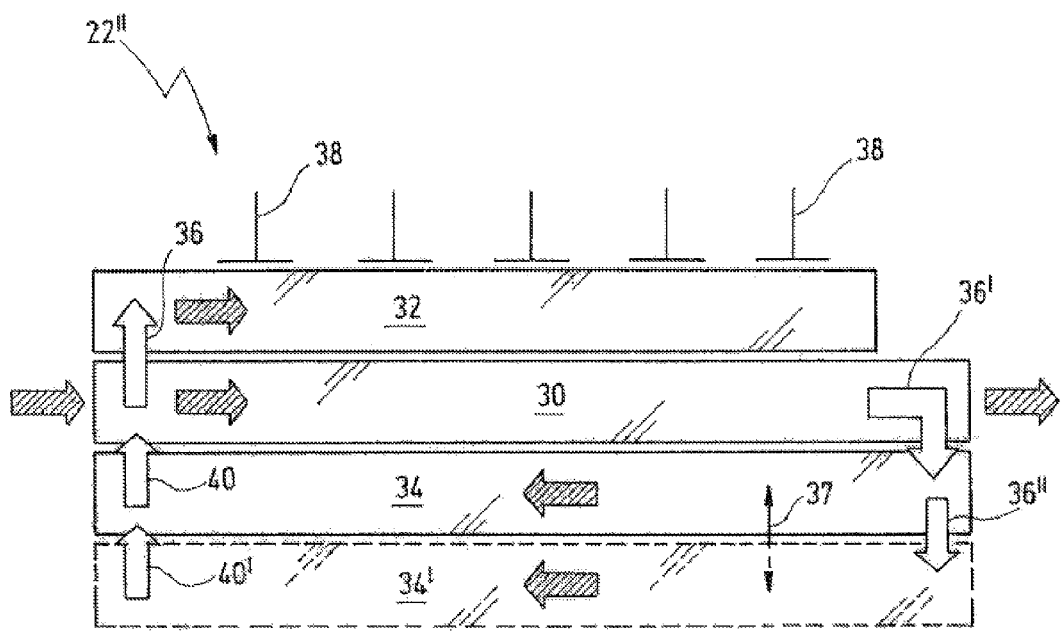
FIG. 3 shows a second embodiment of a shipping buffer of the present invention.

With reference to FIG. 3, a second embodiment of a shipping buffer 22" in accordance with the present invention is shown. The shipping buffer 22" is distinguished from the shipping buffer 22' in that an additional (third) buffer line 34' adjoins to the second buffer line 34. Even further, an additional feed device 36" is provided in the region of the downstream end of the second buffer line 34, allowing feeding goods from the second buffer line to the third buffer line 34'. In an analogous manner, a discharge device 40' is provided at an upstream end of the third buffer line 34', allowing discharging of goods from the third buffer line 34' to the second buffer line 34. The storage capacity of the shipping buffer 22" is increased by means of the third buffer line 34' in comparison to the storage capacity of the shipping buffer 22' of FIG. 2, i.e. by the buffer locations of the third buffer line 34'. An optionally provided line-change device is shown by a broken line between the second and third buffer lines. The sequence of the goods in a circle, which is formed by the second and third conveyor lines, can be changed with the line-change device.

Figure 4A:
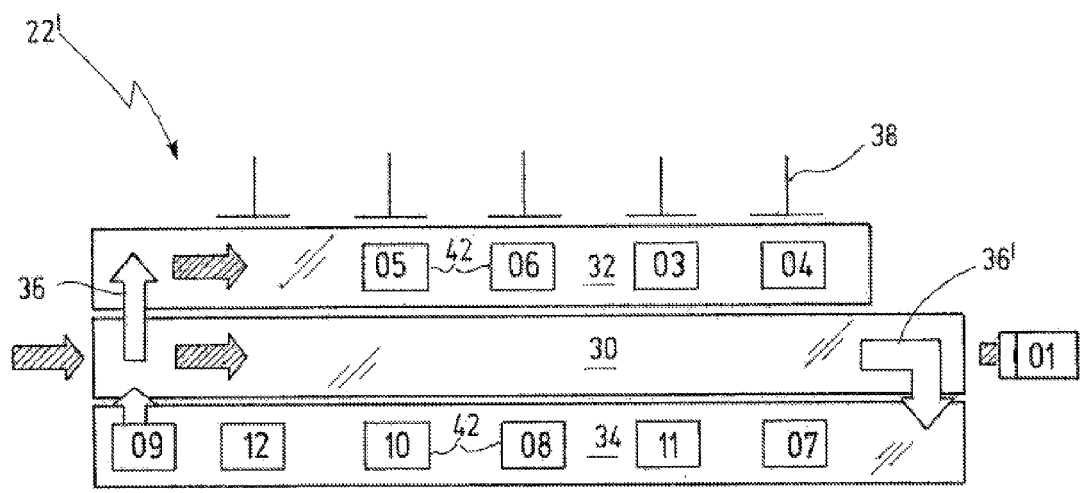
FIG. 4a-c show a temporal sequence of a sorting and withdrawing process in accordance with the present invention.
Figure 4B:
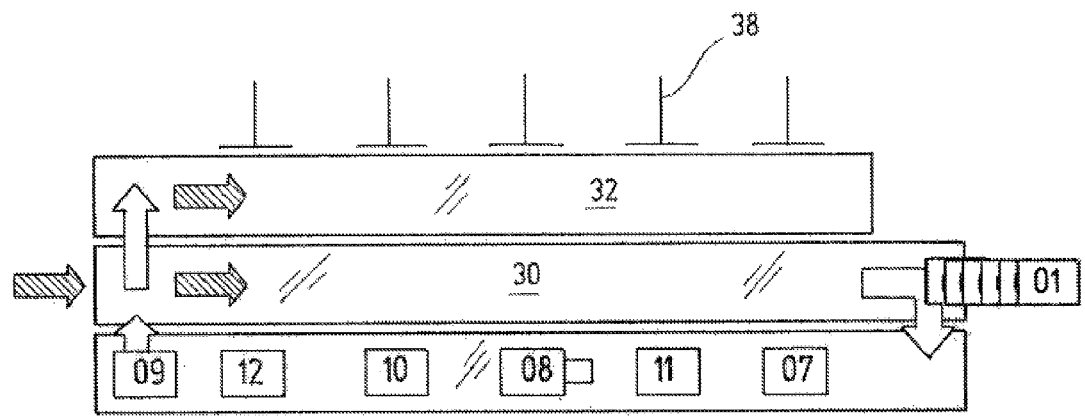
Figure 4C:
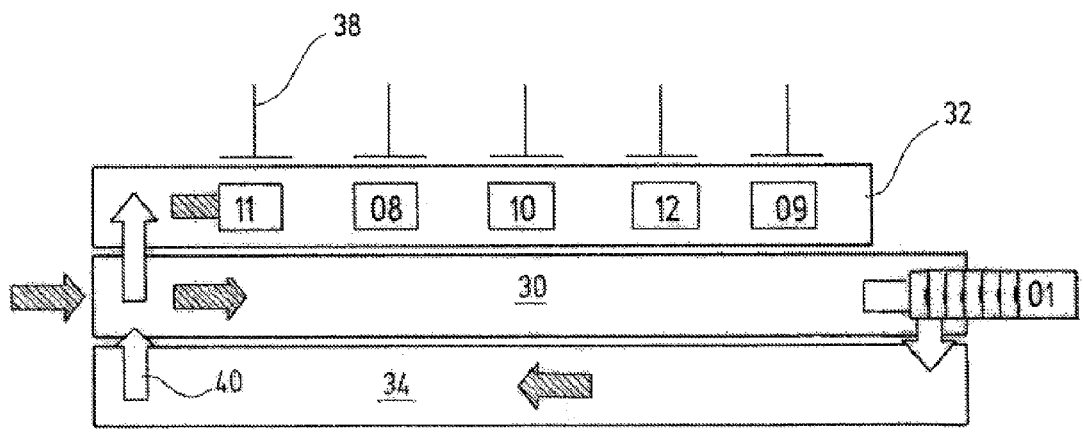

A storing and sorting process including the shipping buffer 22' of FIG. 1 is shown in the FIGS. 4a to 4c, wherein twelve goods 42, which are delivered chaotically to the withdrawal line 30, are to be brought into a sorted sequence.

The withdrawal line 30 has the same geometrical length like the second buffer line 34. In FIG. 4a, the second buffer line 34 exemplarily comprises seven buffer locations. Six goods 42 have already been fed into the second buffer line 34. The goods 42 are numbered by "01" through "12" in FIGS. 4a to 4c. In FIG. 4a, the goods having the numbers "9", "12", "10", "08", "11" and "07" are located on the second buffer line 34. The goods 42 having the numbers "05", "06", "03" and "04" have been fed into the first buffer line 32 by means of the feed device 36. The goods 42 having the numbers "01" and "02" have already been delivered towards a shipping location at a handover point 41 (cf. FIG. 2), which is indicated in FIG. 4a in that the goods "01" and "02" are illustrated on the right-hand side, outside of the withdrawal line 30.

In the FIGS. 4a to 4c, a shipment of goods or a batch of goods 42 consists of twelve goods 42 in total. These twelve goods 42 have been retrieved by a superordinated control system such as a warehouse management computer, from the warehouse area 12 to 16 (cf. FIG. 1) and delivered to the shipping buffer 22'. The delivery has happened in a chaotic sequence. However, the goods 42 are to be delivered by the shipping buffer 22' in an ascending manner from the good "01" to the good "12".

Since the shipping buffer 22' is provided with three lines (one withdrawal line and two buffer lines), it is recommended to divide the shipment of goods into at least two parts or segments. In the example of the FIG. 4a, the shipment of goods has been divided into two segments. The first segment includes the goods "01" to "06". The second segment includes the goods "07" to "12". The first segment is assigned to the first buffer line 32. The second segment is assigned to the second buffer line 34.

If the goods 42 of the shipment of goods are now delivered chaotically to the withdrawal line 30, then the superordinated control device already has knowledge of the—unsorted—sequence by which the goods are delivered to the withdrawal line 30, or a sensing device is provided upstream relative to the withdrawal line 30 for determining the sequence of the delivered goods 42. In dependence on the assigned segment one of the goods 42 is then either fed into the first buffer line 32 or the second buffer line 34. Such goods 42, which are already delivered in the right sequence to the withdrawal line 30, can be delivered directly towards a shipping location at the handover point, such as the goods "01" and "02" in the FIG. 4a.

With reference to FIG. 4b the shipping buffer 22' of FIG. 4a is shown at a later time. The goods "05", "06", "03" and "04" have been pushed (back) in the right sequence from the first buffer line 32 onto the withdrawal line 30 by means of the transfer devices or the pushers 38. This is indicated in FIG. 4b in that the goods "01" to "06" are shown in a stacked manner on the right edge of the withdrawal line 30.

These goods 42 are moved from the buffer line 34 over the discharge device 40 onto the withdrawal line 30 for allowing delivering also the remaining goods "07" to "12" in the right sequence towards a shipping location. The remaining goods are fed from the withdrawal line 30 into the first buffer line 32 by means of the feed device 36 and then moved downstream in front of the pushers 38 by means of the belt conveyor.

The good "07", which stood in FIG. 4b on the buffer location right at the back of the second buffer line 34, has been withdrawn directly via the withdrawal line 30. Subsequently, the goods "08" to "12" are pushed in an ascending manner from the first buffer line 32 onto the withdrawal line 30 by means of the pushers 38. From there, the goods 42 are then conveyed towards the shipping location, which is not shown in the FIG. 4c.

Figure 5A:
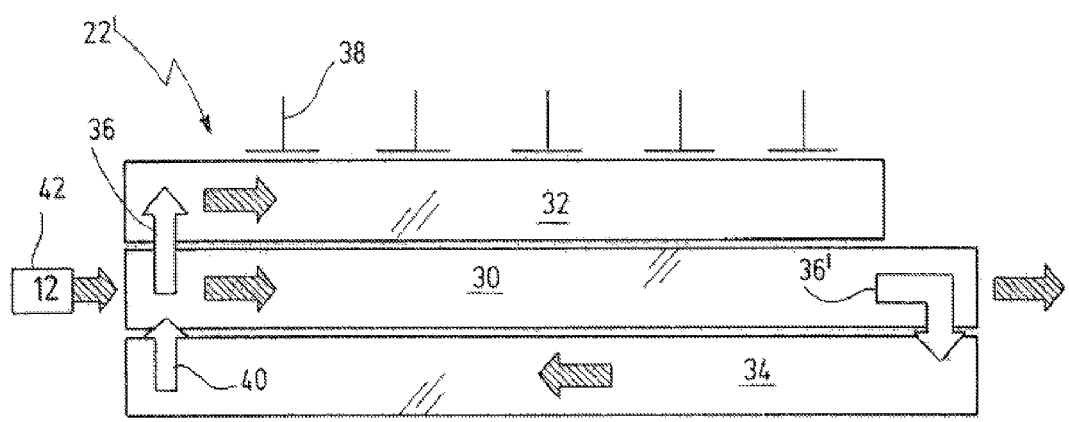
FIG. 5a-c show a sorting and withdrawing sequence of a complex and unsorted sequence of goods.
Figure 5B:
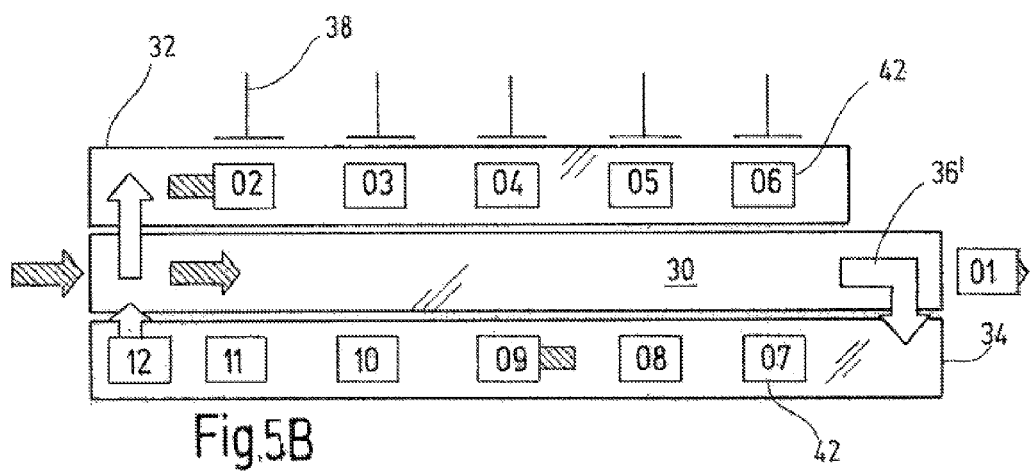
Figure 5C:
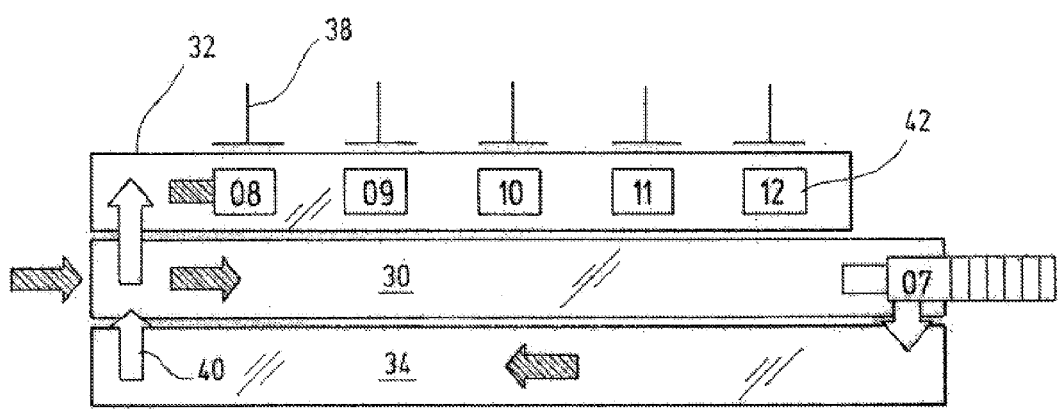

With reference to the FIGS. 5a to 5c a worst case scenario is outlined. The shipping buffer 22' used is not distinguished from the shipping buffer 22' of the FIGS. 4a to 4c. The shipment of goods in turn comprises twelve articles "01" to "12" which are to be delivered or withdrawn in accordance with ascending numbers (right sequence) towards a shipping location which is not depicted. As shown in FIG. 5a, first the good "12" is delivered to the withdrawal line 30, which is to be delivered in accordance with the sequence known as a last item from the withdrawal line 30 towards the shipping location. Further, the example of the FIGS. 5a to 5c is based on that the good "01" of the shipment of goods is delivered to the withdrawal line 30 at the end.

This means that almost all of the goods 42 of the shipment of goods need to be buffered on the buffer lines 32 and 34 before they can be withdrawn. This is shown in FIG. 5b. The good "01" has been delivered to the withdrawal line 30 at the end. In the FIG. 5b, the good "01" then has been forwarded directly towards the shipping location.

In this context, the shipment of goods again has been divided into two segments, since two buffer lines are provided. It has turned out as an advantage if the number of the segments is lower by one in comparison to the number of the lines of the buffers being provided in total. Three lines are provided in the examples of the FIGS. 4 and 5 so that two segments can be handled well. As shown in FIG. 5b, all of the goods 42 or the shipment of goods can be moved onto one of the buffer lines 32 and 34 in this manner for the time being. The feeding into the buffer lines 32 or 34 represents a first sequencing stage. The second sequencing stage is implemented by the pushers 38. The goods "02" to "06" located on the first buffer line 32 at respectively one buffer location can be pushed onto the withdrawal line 30 in the right sequence.

As soon as the goods "02" to "06" have been delivered from the first buffer line 32 to the withdrawal line 30 and are transported towards the shipping area, the goods "07" to "12" parked on the second buffer line 34 are moved to the buffer line 32. This is shown in FIG. 5c, wherein the good "07", similar to FIG. 4c, has already been transported directed towards the shipping location. Subsequently, the goods "08" to "12" can be pushed in accordance with the desired sequence onto the withdrawal line 30 by means of the pushers 38 where they are conveyed towards the shipping location in the right sequence, again indicated by the shaded arrows.

Figure 6A:
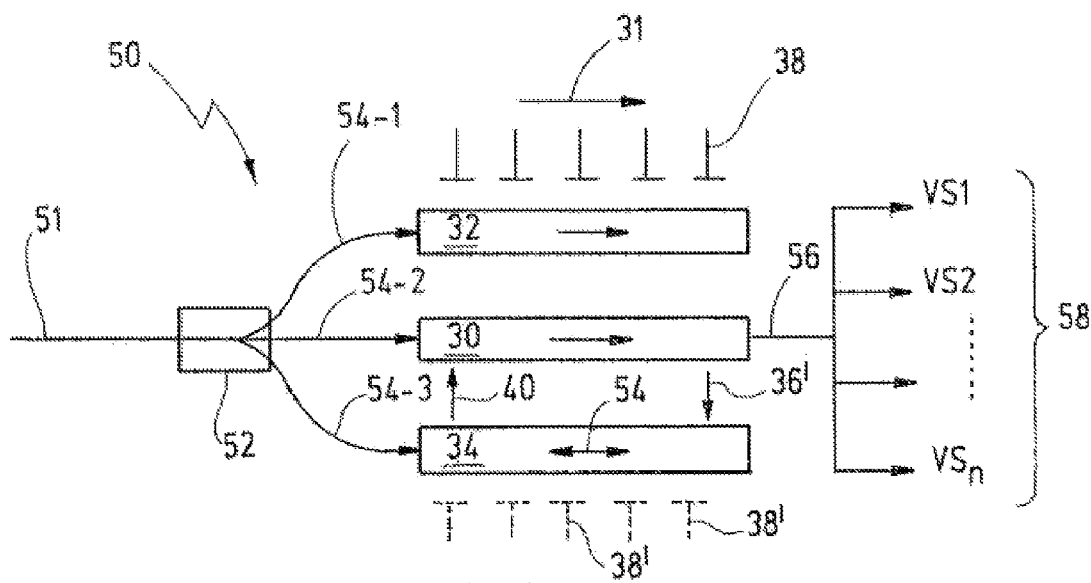
FIG. 6a-c show a heavily schematized flow chart of a material flow of different embodiments of the shipping buffer of the present invention.
Figure 6B:
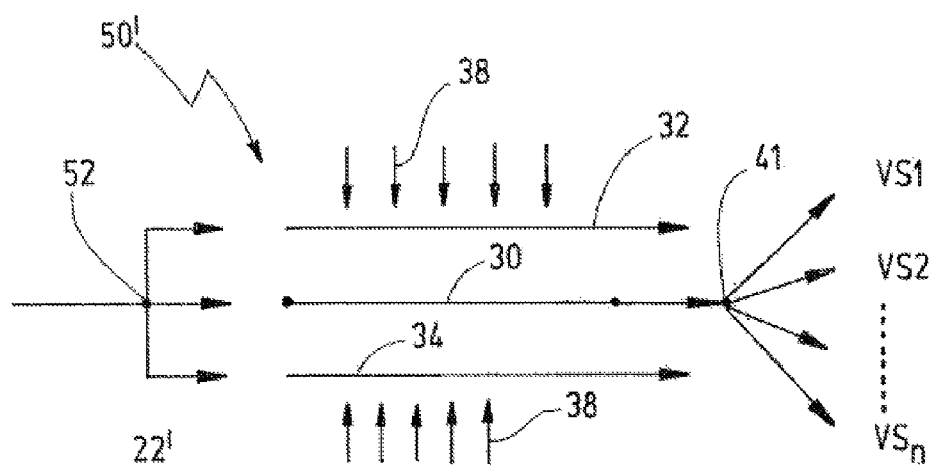

With reference to FIGS. 6a to 6b flow charts of a material flow of another embodiment of a shipping buffer 50 (FIGS. 6a and 6b) in accordance with the invention and the shipping buffer 22' (FIG. 6c) of the FIGS. 4 and 5 are shown.

The shipping buffer 50' of FIG. 6a differs from the shipping buffer 22' of FIGS. 4 and 5 in that the goods are directly directed to the lines 30, 32 and 34. In the FIGS. 4 and 5, the goods 42 have been fed to the buffer lines via the withdrawal line 30.

A conveyor switch 52 is located upstream relative to the lines 30, 32 and 34 in FIG. 6a. The goods 42 are generally transported towards the shipping buffer 50 via a conveyor 51, for example, from the warehouse area (cf. FIG. 1). The switch 52 guides the unsorted goods 42 into the lines 30, 32 or 34 assigned thereto. As before, the goods 42 of a shipment of goods have been divided into segments which in turn have been respectively assigned to one of the lines. Conveyor sections 54-1, 54-2 and 54-3 are provided between the switch 52 and the lines 30, 32 and 34 for respectively coupling the conveyor 51 separately to one of the lines 30, 32 and 34.

Another conveyor 56 couples to the downstream end of the withdrawal line 30, wherein the shipment of goods can be supplied in the sorted sequence to a plurality 58 of shipping locations VS1, VS2, . . . , VSn (n can be selected as desired) with shipments of goods in a sorted sequence. It is clear that, in general, as many buffer lines as desired can be utilized.

In FIG. 6a, further optional transfer devices 38' are indicated by broken lines laterally beneath the second buffer line 34.

In FIG. 6b, the shipping buffer 50 of FIG. 6a is shown in a modified embodiment 50'. The transfer devices 38, 38' are arranged both laterally to the first buffer line 32 and laterally to the second buffer line 34. In this case, the buffer lines 32 and 34 are operated only in a downstream direction. The feed device 36' as well as the discharge device 40' between the withdrawal line 30 and the second buffer line 34 have been saved. Therefore, the second buffer line 34 of FIG. 6b only conveys in the downstream direction, in contrast to the second buffer line 34 of FIG. 6a which can be operated in both directions as illustrated by a double arrow 54 in FIG. 6a.

The goods 42 can be pushed from the buffer lines 32 and 34 onto the withdrawal line 30 by means of the pushers 38, 38'. The goods 42 are then conveyed downstream towards the handover point 41, where they are distributed to the shipping locations VS1, . . . , VSn.

Figure 6C:
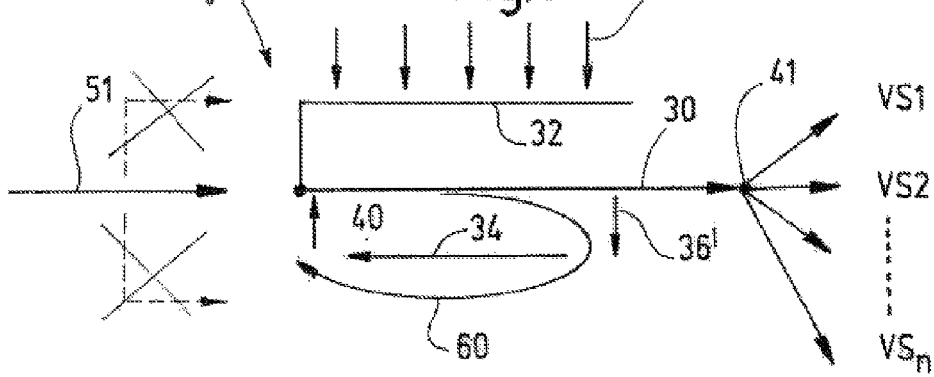

In FIG. 6c the material flow at the workstation 22' of the FIGS. 4 and 5 is once again shown. In comparison to the shipping buffer 50' of FIG. 6, the switch 52 as well as the conveyor sections 54 are lacking. The goods 42 are delivered directly to the withdrawal line 30. The withdrawal line 30, the feed device 36', the second buffer line 34 and the discharge device 40 form a conveyor circle 60.

Figure 7:
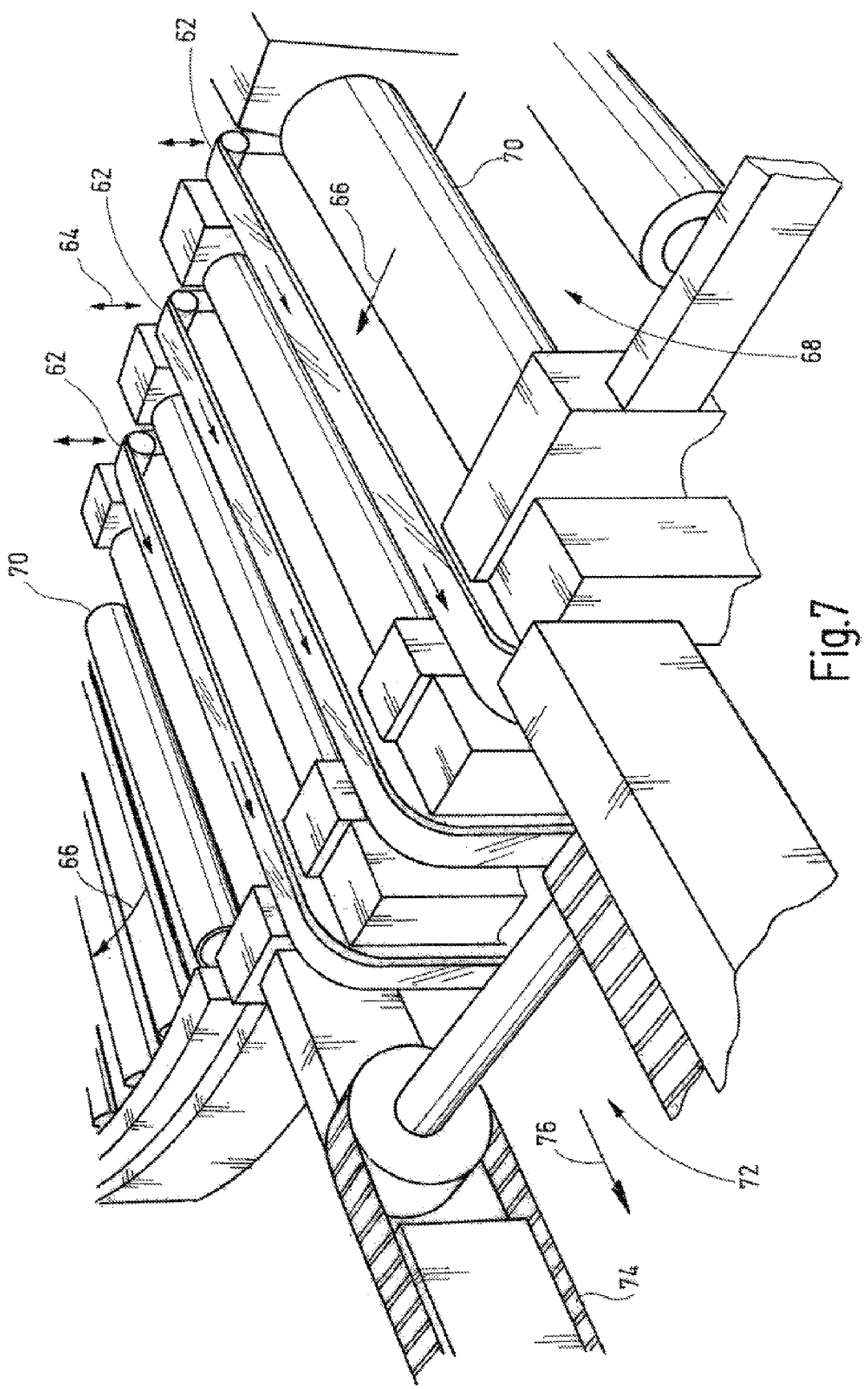
FIG. 7 shows a perspective view of a schematic belt discharger.

In FIG. 7 a perspective view of a feed and discharge device in the shape of a belt discharger is shown.

In this case, the belt discharger comprises three belts 62 which can be lifted and lowered, as indicated by a double arrow 64, relative to a roller conveyor 68, which is operated in the main conveyance direction 66. The roller conveyor 68 comprises a plurality of rollers 70. The belts 62 are arranged in a space between neighbouring rollers 70 so that the goods can be transported-off laterally from the roller conveyor 68. It is clear that lines shown in the proceeding figures can be implemented, for example, as roller conveyors. The feed and discharge devices can be implemented as belt dischargers, as shown in FIG. 7.

The belt discharger of FIG. 7 exemplarily couples to a chain conveyor 72 comprising two distanced chain drives 74 in parallel, which can be operated along an arrow 76 (parallel to the belt discharger).

The belt discharger of FIG. 7 can also be used as a switch 52 (cf. FIG. 6), if the endlessly rotating belts 62 can be driven in both directions.

With reference to FIG. 8 another embodiment, which is particularly advantageous, of a shipping buffer 80 in accordance with the present invention is shown. FIG. 8 illustrated a perspective view of a withdrawal line 30, which is arranged centrally relative to two "buffer lines" which in this case are implemented as vertical rotary racks 86. Further, in FIG. 8 a superordinated warehouse management computer or a material flow computer 82 is indicated as a cloud. The computer 82 communicates with the individual conveyor elements (lines. switches, pushers, feeders, dischargers, rotary racks, etc.) via a data connection 84, particularly for influencing the flow of goods. The data connection 84 can happen in a wireless manner or via solid connections such as a bus system.

The vertical rotary racks 86 can vertically rotate in both directions (cf. arrow 88).

Figure 9:
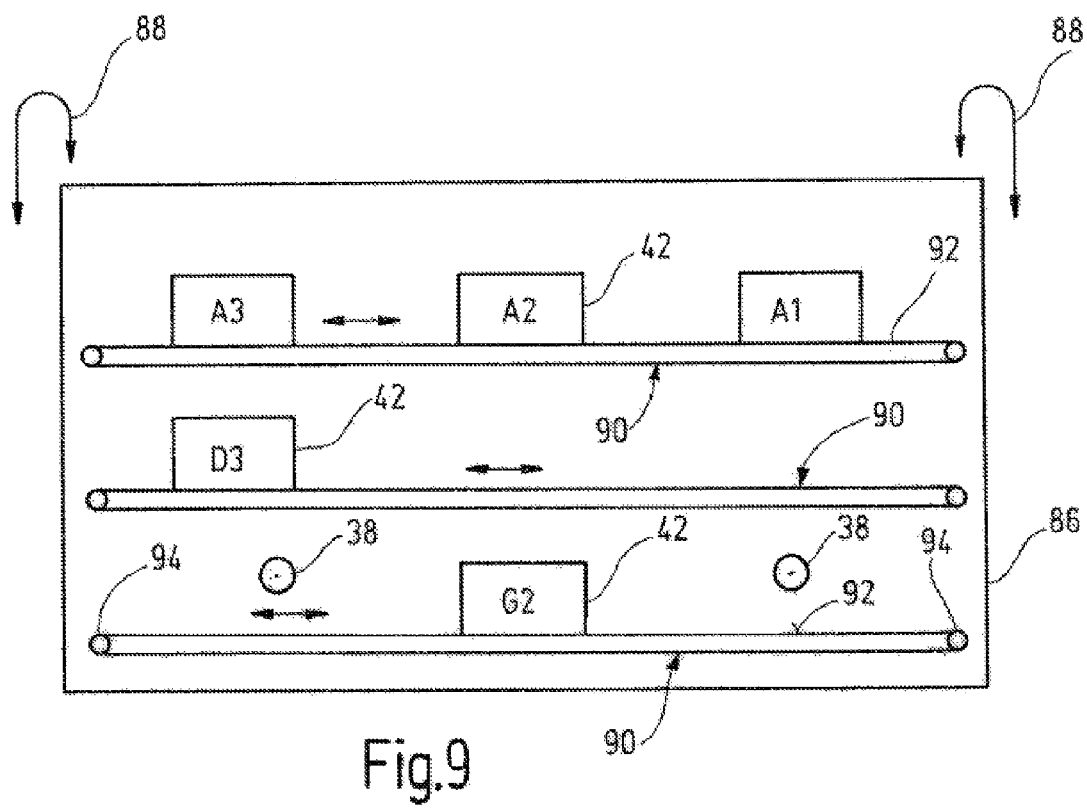
FIG. 9 shows a side view of the vertical rotary rack of FIG. 8.

With reference to FIG. 9 a side view of one of the vertical rotary racks 86 is shown.

The vertical rotary rack 86 comprises a plurality of rack compartments 90, wherein only three are shown in FIG. 9. The rack compartments are connected at their lateral ends, for example, to chains, which are endlessly rotating in a vertical direction, for allowing performing the run-through movements 88. In this case, the rack compartments are realized in the shape of belts, which endlessly rotate in a horizontal direction, and are redirected at their ends around return pulleys 94. In this case, stabilization elements, which are not shown, are provided between the return pulleys 94 for preventing the belt 92, particularly the middle thereof, from sagging.

The three rack compartments 90 of FIG. 9 respectively correspond to one of the buffer lines, as depicted for the horizontal embodiments of the shipping buffers 22' and 50 (cf. FIGS. 2-6) in accordance with the present invention. The uppermost rack compartment 90 of FIG. 9 is assigned to a shipment of goods or a segment "A". The shipment of goods "A" here consists of three goods 42. The shipment of goods "A" is complete, since the three goods "A1", "A2" and "A3" are already buffered in the rack compartment 90. The shipment of goods "A" is thus ready for being transported away by means of one of the trucks. However, it is possible that this truck still needs to take along additional shipments of goods so that the shipment of goods "A" remains in the shipping buffer for the time being. It is clear that the goods "A1" through "A3" do not necessarily be present in the right sequence relative to the rack compartment 90. By pushing out the goods 42 onto the withdrawal line, these goods 42 can be arranged in the right sequence, as already described in the context of the FIGS. 4 and 5. The pushers 38 are arranged in the lowermost rack compartment in FIG. 9. It is clear that the pushers 38 can also be arranged at another height relative to the rotary rack 86. In FIG. 8. the withdrawal line 30 is arranged at ground level so that the pushers 38 of the rotary racks 86 have to be arranged in the first plane. However, in dependence on the facility, the rotary racks 86 can extend beneath the withdrawal line 30 so that the pushers 38 in this case are to be arranged, for example, in the center of the rack 86.

The center rack compartment 90, which is assigned to the shipment of goods "D", still waits for the remaining two goods "D1" and "D2". Since the belt 92 is operable in both directions, the good "D3" can be moved to an arbitrary buffer location. In FIG. 9, the good "D3" has been moved to the buffer location being located on the outer left of the, in total three, buffer locations of the rack compartment 90.

The lowermost rack compartment 90 of FIG. 9 is assigned to the shipment of goods "G", which has buffered only the good "G2" by now.

The big potential of the present invention can easily be recognized from the FIGS. 8 and 9. Many shipments of goods can be stored and sorted on the smallest storage area. The system of the present invention can be extended as desired. The rotary racks 86 can be extended with regard to height, length as well as the number thereof.

As shown in FIG. 8, the goods are delivered in the sorted sequence to the conveyor 56 at the handover point 41, wherein the conveyor 56 in turn subsequently delivers the goods to the shipping locations VSn which can be arranged remote relative to the shipping buffer 80. Of course, the handover point 41 can also be coupled directly to one single shipping location so that the goods can be loaded directly in the right sequence into one of the trucks 24 (cf. FIG. 1). In this case, one could omit the conveyor 56. Utilization of vertical elevators in the region of the handover point 41 is also possible.

Figure 10:
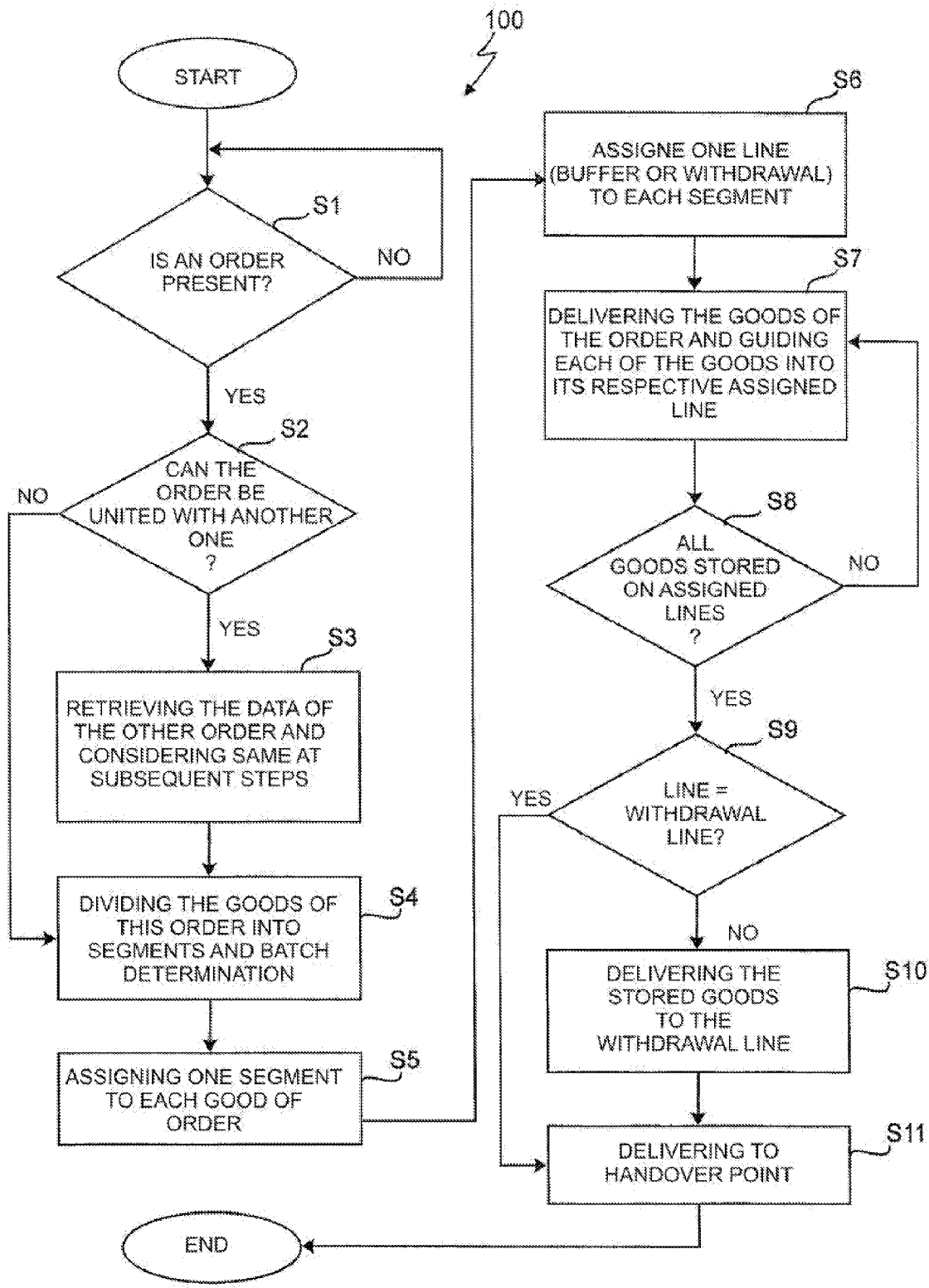
FIG. 10 shows a flow chart of the method of the present invention.

With reference to FIG. 10 a method for preparing a shipment of goods in accordance with the present invention is illustrated.

In a first step S1 it is retrieved whether an order is to be processed, or if an order is present at all. If no order is present, then the control device 82 does not need to do anything. However, if an order is present, then the control device 82 checks whether the present order can be united with an order already existing (step S2). This makes sense in such cases where several orders are to be loaded into one and the same truck 24. In this context, it is not required that the orders belong to the same subsidiary. The truck 24 can also supply several subsidiaries during one trip.

If the inquiry of step S2 determines that the present order can be united with another order, then the data of the other order are retrieved in a step S3 and considered during the processing of the subsequent steps (sorting of goods, and withdrawing the goods towards the truck).

However, if the order is to be processed in an isolated manner, then in step S4 the goods are divided into segments, which all belong to the same hatch or shipment of goods, as already described above.

In a step S5, each of the goods of one order is assigned to a segment.

In a step S6 each of the segments is assigned to one line (buffer line or withdrawal line, but preferably the buffer line).

In a step S7, the goods are then transported towards the withdrawal line 30 and are guided into the respectively assigned line either at the entrance of the withdrawal line 30 or already in front thereof.

Subsequently, it is queried whether all the goods of one segment are stored on the line assigned thereto (step S8). If not yet all of the goods are present, then one returns to the step S7. If all of the goods are present, then it is queried in step S9 line-by-line whether the currently queried line corresponds to the withdrawal line 30.

If the relevant line is not the withdrawal line 30, then the content of the relevant line is delivered to the withdrawal line 30 in a step S10. For example, the first or second buffer line 32 or 34 delivers the goods 42 stored thereon to the withdrawal line 30. However, if the relevant line is the withdrawal line itself, then all the goods being present on the withdrawal line 30 are delivered to the handover point 41 in a step S11.

Then, the goods are distributed in the sorted sequence from the handover point 41 to the shipping locations VSn. Hence, the trucks 24 are loaded in the right sequence. The method is then completed.

What is claimed is:

1. A scalable shipping buffer having an integrated sorting function for preparing a shipment consisting of several different goods, wherein the goods are to be loaded in or on a transport vehicle in a sorted sequence and wherein the goods are delivered to the shipping buffer in an unsorted sequence, comprising:

a handover point;
a driven withdrawal line for conveying downstream the goods to the handover point where the goods are handed over towards a transport vehicle in accordance with the sorted sequence, wherein the withdrawal line substantially extends along a longitudinal direction;
a driven first buffer line extending substantially parallel and adjacent to the withdrawal line, the first buffer line comprising a first number of buffer locations;
a plurality of transfer devices, wherein the transfer devices are arranged such that each buffer location of the first buffer line has assigned at least one of the transfer devices for transferring one or more of the goods from the first buffer line to the withdrawal line;

a feed device arranged such that the goods, which are supplied to the withdrawal line in the unsorted sequence, are feedable into the first buffer line;

a driven second buffer line extending parallel to the withdrawal line and adjacent to either the withdrawal line or the first buffer line, wherein the goods on the second buffer line can be moved oppositely relative to the first buffer line and withdrawal line;

a second feed device arranged such that the goods from the withdrawal line or the first buffer line are feedable into the second buffer line;

a discharge device being arranged for discharging the goods, which are located on the second buffer line, onto the withdrawal line or first buffer line, and a control device for controlling the scalable shipping buffer.

2. The shipping buffer of claim 1, wherein the withdrawal line is arranged centrally between the buffer lines.

3. The shipping buffer of claim 1, wherein the second feed device is arranged at a downstream end of the withdrawal line or first buffer line, and wherein the discharge device is arranged at an upstream end of the second buffer line.

4. The shipping buffer of claim 1, wherein a transfer device is provided at each of the buffer locations of the at least first buffer line.

5. The shipping buffer of the claims 4, wherein the second buffer line adjoins with the longitudinal side thereof in parallel to the withdrawal line, and comprises a second number of buffer locations, wherein each buffer location of the second buffer line has assigned one of the transfer devices.

6. The shipping buffer of claim 1, wherein additional buffer lines respectively having additional feed devices and additional discharge devices are provided.

7. The shipping buffer of claim 6, wherein adjacent buffer lines comprise at least one line-change device allowing the goods to change spatially between the feed and the discharge devices of one of the buffer lines to the adjacent buffer line.

8. The shipping buffer of claim 1, wherein the lines have an almost identical geometrical length.

9. The shipping buffer of claim 1, wherein the lines comprise driven conveyor means for transporting the goods in the longitudinal direction.

10. The shipping buffer of claim 1, wherein pushers, which are arranged laterally relative to the first buffer line, or belt dischargers, which are moveable in height, are used as transfer devices.

11. The shipping buffer of claim 10, wherein the belt dischargers are oriented transversally relative to the longitudinal direction of the lines and are further arranged in recesses of the lines.

12. The shipping buffer of claim 11, wherein the lines are roller conveyors.

13. The shipping buffer of claim 1, wherein at least one of the buffer lines is part of a vertical rotary rack having rack compartments, wherein each rack compartment of the vertical rotary rack comprises a driven conveyor means for conveying the goods, which have been delivered to the respective rack compartment, in at least one of an upstream direction and a downstream direction, and wherein each of the rack compartments is stoppable at a height of the withdrawal line for causing a transfer of the goods between the respective rack compartment and the withdrawal line.

14. The shipping buffer of claim 13, wherein several withdrawal lines are arranged on top of each other, and wherein each of the withdrawal lines is fed with the goods via a separate conveyor line.

15. The shipping buffer of claim 13, wherein a vertical elevator is arranged at least at one of an upstream end and a downstream end of the withdrawal line, in order to allow delivery of the goods located on a respective withdrawal line to shipping locations arranged on top of each other.

16. The shipping buffer of claims 13, wherein the handover point couples to a shipping conveyor line, which supplies a plurality of shipping locations being arranged side-by-side with the goods in the sorted sequence.

* * * * *